United States Patent
Joly et al.

(10) Patent No.: US 8,078,320 B2
(45) Date of Patent: Dec. 13, 2011

(54) METHOD AND A DEVICE FOR ADJUSTING OPERATING PARAMETERS OF A ROBOT, A PROGRAM AND A RECORDING MEDIUM FOR THE METHOD

(75) Inventors: Lüc Joly, Faverges (FR); Matthieu Guilbert, Saint Martin d'Heres (FR); Pierre-Brice Wieber, Grenoble (FR)

(73) Assignee: Staubli Faverges, Faverges (FR)

( * ) Notice: Subject to any disclaimer, the term of this patent is extended or adjusted under 35 U.S.C. 154(b) by 1264 days.

(21) Appl. No.: 11/790,807

(22) Filed: Apr. 27, 2007

(65) Prior Publication Data

US 2007/0252839 A1    Nov. 1, 2007

(30) Foreign Application Priority Data

Apr. 28, 2006 (FR) ...................................... 06 03855

(51) Int. Cl.
*G06F 19/00* (2011.01)
*G05B 13/02* (2006.01)
*G05B 19/18* (2006.01)

(52) U.S. Cl. .......... 700/253; 700/245; 700/33; 700/175; 318/561

(58) Field of Classification Search .................. 700/175, 700/56, 61, 63, 65, 28, 33, 34, 174, 253, 700/245; 318/560, 568.21, 568.18, 586.11, 318/561, 568.23; 374/46, 47, 141; 703/2; 409/134; 702/182; 901/49, 50, 19, 38
See application file for complete search history.

(56) References Cited

U.S. PATENT DOCUMENTS

| | | | |
|---|---|---|---|
| 5,889,926 A | 3/1999 | Bourne et al. | |
| 6,456,896 B1* | 9/2002 | Ito et al. | 700/193 |
| 6,604,005 B1 | 8/2003 | Dorst et al. | |
| 6,892,153 B2* | 5/2005 | Puchtler | 702/105 |
| 7,084,595 B2* | 8/2006 | Brogardh et al. | 318/560 |
| 7,672,745 B1* | 3/2010 | Tuszynski | 700/97 |
| 2004/0064297 A1* | 4/2004 | Alvarez et al. | 703/2 |

FOREIGN PATENT DOCUMENTS

WO    02/074501    9/2002

* cited by examiner

*Primary Examiner* — Thomas Black
*Assistant Examiner* — Christine Behncke
(74) *Attorney, Agent, or Firm* — Dowell & Dowell, PC

(57) ABSTRACT

A method of adjusting operating parameters of a robot to move an effector tool along a given path in an optimum cycle time including a step of modifying operating parameter values to cause the cycle time to approach a optimal value wherein the parameters are modified so as to approach an extremum of a compromise function including at least first and second terms, the first term being a function of a cycle time and the second term being a function of at least one of temperature and degree of wear of an actuator.

12 Claims, 3 Drawing Sheets

METHOD AND A DEVICE FOR ADJUSTING OPERATING PARAMETERS OF A ROBOT, A PROGRAM AND A RECORDING MEDIUM FOR THE METHOD

BACKGROUND OF THE INVENTION

1. Field of the Invention

The invention relates to a method and a device for adjusting operating parameters of a robot, and to a program and a recording medium for the method.

2. Description of the Related Art

Methods exist for adjusting operating parameters of a robot that serves to move an effector tool along a given path in an optimum cycle time.

When it is desired to minimize the cycle time, such methods are known under the term "minimum time control".

The cycle time is the time needed by the robot to cause the effector tool to travel all the way along a given path from a starting point to a destination point, while passing via intermediate points of passage. Generally, the robot repeats the same movement several times over so that the path constitutes a closed loop where the starting point and the destination point are the same.

The operating parameters of the robot determine the accuracy with which the effector tool travels along the given path and also the speed and the acceleration of the effector tool along said path. More precisely, the operating parameters can be used by an electronic robot control unit which, on the basis of the operating parameters and of the point of passage on the given path, is capable of controlling the electric actuators of the robot so that the robot moves the effector tool along the given path. By way of example, the operating parameters are a maximum acceleration, a maximum deceleration, and a maximum speed that can be accepted over a portion of the given path, or the duration required for traveling along a portion of the path.

The operating parameters of a robot are very numerous. Furthermore, the relationships between those operating parameters and integratable operating constraints are often very complex.

The term "integratable operating constraint" is used to mean limit values for integratable physical magnitudes of the actuators of the robot. The value of each integratable physical magnitude is the result of integrating the instantaneous value of other physical magnitudes along the complete path. In other words, the values of these integratable physical magnitudes are calculated by integrating the instantaneous values of one or more other physical magnitudes of the robot between the starting point and the destination point of the given path.

By way of example, such integratable physical magnitudes are the operating temperatures of an actuator, of a lubricant, of a joint, of on-board electronic components (encoders, . . . ), . . . etc. The degree of wear of ball bearings in transmissions is likewise an integratable physical magnitude. Operating temperature and degree of wear are functions of integrating instantaneous values over the entire path, which instantaneous values are the values of other physical magnitudes such as the speed of rotation or the power supply current of an actuator.

In the description below, each operating parameter is written $p_j$ where the subscript $j$ is an identifier of the operating parameter. A vector $\vec{P}$ of operating parameters is also defined by the following relationship:

$$\vec{P} = (p_1; p_2; \ldots, p_j; \ldots; p_m)^T$$

where:
$T$ is the transposition function; and
$m$ is the number of operating parameters.

There are control methods in existence that take account of temperature limits for robot actuators in order to adjust the operating parameters so as to achieve a minimum cycle time (see for example WO 02/074501). By way of example, the temperature limits for each actuator are defined on the basis of data supplied by the manufacturer of the actuator.

On the basis of measurements performed during a real movement of the effector tool and/or on the basis of readings delivered by a robot movement emulator, those existing methods comprise the following steps:

a) a step of determining the value of the cycle time as a function of the values of the operating parameters;

b) a step of determining the value of an operating temperature resulting from following the complete path; and c) a step of modifying the values of the operating parameters to move the cycle time closer to its optimum value.

Steps a) to c) are reiterated so long as the cycle time can still be minimized without the operating temperature exceeding its limit value.

Typically, the cycle time and the operating temperatures vary in opposite directions. Thus, the shorter the cycle time, the higher the operating temperature of each actuator. As a result, the minimum cycle time is achieved when at least one of the operating temperatures is equal to its limit value. Existing methods thus lead systemically to causing the robot to operate with an operating temperature that is equal to its limit value. This is not desirable in all situations. For example, the following situations might be preferred:

1) adjusting the operating parameters so as to obtain a cycle time that is slightly longer than the cycle time obtained using existing methods, but with operating temperatures that are well below the limit values; and 2) adjusting the operating parameters so as to obtain a cycle time that is considerably shorter than that obtained using existing methods, even though that requires operating at an operating temperature that is slightly above the limit value.

SUMMARY OF THE INVENTION

The invention seeks to provide a method of adjusting the operating parameters of a robot so as to make it possible to achieve above situation 1) or 2).

The invention thus provides a method of adjusting the operating parameters of a robot in which, during step c), the values of the operating parameters are modified so as to approach an extremum of a compromise function, the compromise function comprising at least first and second terms, the first term being a function of the cycle time determined during step a), and the second term being a function of the temperature and/or the degree of wear determined during step b).

The use of this compromise function makes it possible to go for an optimum in which the savings in terms of cycle time is counterbalanced by an above-limit increase in temperature and/or degree of wear of the robot. Thus, this method makes it possible to exceed the limit value for the operating temperature or for the degree of wear of an actuator when the saving in terms of cycle time is significant and when exceeding the limit value remains acceptable. Conversely, the above method makes it possible to remain well away from each of the limit values for temperature and for degree of wear, if the decrease in cycle time is small compared with the increase in operating temperature or degree of wear.

Thus, this method makes it possible to obtain a cycle time that is significantly shorter than that obtained with existing methods, at the price of slightly exceeding certain limit values.

The above method also makes it possible to obtain a cycle time that is substantially equal to that obtained using existing methods but with the operating temperature or the degree of wear being maintained at levels that are significantly lower.

Implementations of the method may include one or more of the following characteristics:

the compromise function also includes a third term that is a function of the instantaneous torque exerted by each actuator;

the compromise function also includes a fourth term that is a function of the positioning error of the effector tool relative to the given path;

when the cycle time varies, the first term varies in the opposite direction to the second term or to the sum of the other terms;

at least one of the terms includes an adjustable coefficient, and the method includes a step of a user adjusting the value of said coefficient;

at least one of the terms is a function of the difference between the values determined during step a) or b) and a limit value given for said value;

during step b) the thermal coupling between a plurality of actuators is taken into account in order to determine the operating temperature of at least one of the actuators;

during step b) a prediction of the temperature and/or of the degree of wear under steady conditions is established on the basis of data obtained following a single journey along the given path, and the prediction of the temperature and/or the degree of wear is used to calculate the gradient of the compromise function; and a step of automatically verifying that the compromise function satisfies a predetermined stop criterion, and in the event of the compromise function satisfying the stop criterion, a step of automatically stopping iteration of steps a) to c); and the verification step consists in checking whether the norm (absolute value) of the gradient of the compromise function relative to the operating parameters is less than a predetermined threshold.

These implementations also present the following advantages:

the presence in the compromise function of a term that is a function of the torque exerted by each actuator makes it possible to avoid producing an adjustment that leads to an actuator being required to deliver excessive torque;

the use in the compromise function of a term that is a function of the positioning error makes it possible to avoid producing an adjustment of the operating parameters that leads to significant inaccuracy in the position of the effector tool relative to the given path;

the adjustable coefficients enable the user to define the importance of one term relative to another in the compromise function and thus to specify tolerances on exceeding limit values;

the use of the difference relative to a limit value makes it possible to take account of said limit value being exceeded while adjusting the operating parameters;

taking account of thermal coupling between actuators serves to increase the accuracy with which the operating temperature of each actuator is determined, thus enabling the operating parameters to be adjusted with greater precision;

the use of a prediction of the steady temperature or degree of wear on the basis of a single journey along the path makes the above adjustment method faster; and the use of the gradient of the compromise function in the stop criterion makes it possible to detect an extremum in the compromise function.

The invention also provides a computer program and an information recording medium including instructions for executing the above adjustment method when said instructions are executed by an electronic computer.

The invention also provides a device for adjusting the operating parameters of a robot, the device comprising:

a) a determination module for determining the value of the cycle time as a function of the values of the operating parameters, and for determining the value of the operating temperature and/or the value of a degree of wear for at least one of the actuators of the robot as a result of traveling along the complete path; and b) a modification module for modifying the values of the operating parameters in order to cause the cycle time to approach its optimum value.

The modification module is suitable for modifying the values of the operating parameters so as to approach an extremum of a compromise function, the compromise function comprising at least first and second terms, the first term being a function of the cycle time and the second term being a function of the temperature and/or the degree of wear determined by the module a).

Embodiments of this device include the following characteristic:

at least one of the terms includes an adjustable coefficient, and the device includes a man/machine interface enabling a user to adjust the value of said coefficient(s).

The invention can be better understood on reading following description given purely by way of non-limiting example and made with reference to the drawings, in which.

DESCRIPTION OF THE PREFERRED EMBODIMENTS

Figure 1:
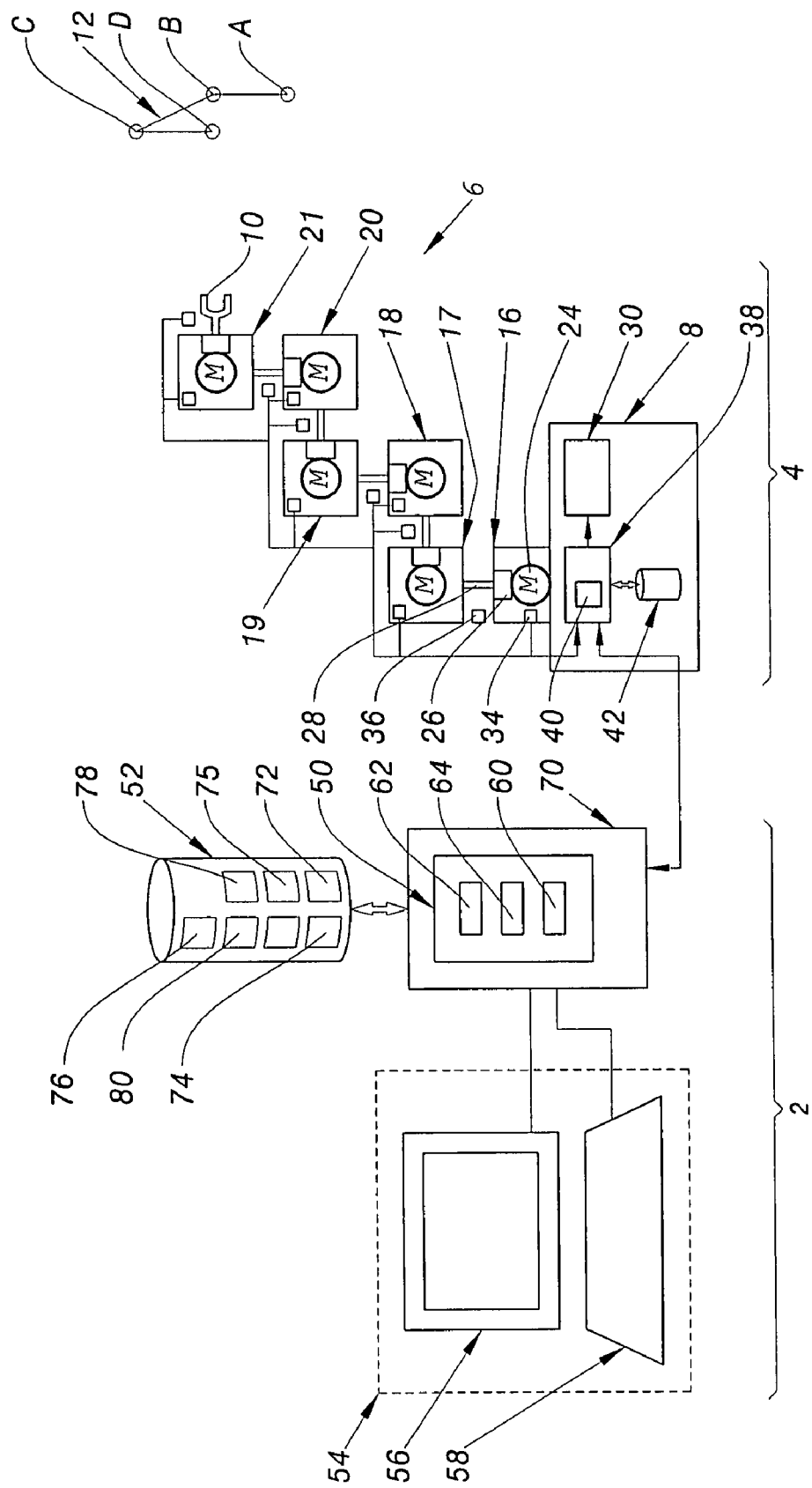
FIG. 1 is a diagrammatic illustration of the architecture of a device for adjusting the operating parameters of a robot.

FIG. 1 shows a device 2 for adjusting the operating parameters of a robot 4. The robot 4 is provided with a hinged arm 6 and with a control cabinet 8.

At one of its ends the arm 6 has an effector tool 10.

Facing the tool 10, points A, B, C, and D represent in perspective a path 12 that the tool 10 is to follow once the robot 4 has been programmed.

By way of illustration, the arm 6 is fitted with six electric actuators 16 to 21 for selectively moving the arm 6 about six hinges. To simplify the description, it is assumed below that the electric actuators 16 to 21 are all identical, and only the actuator 16 is described in detail.

By way of advantage, the actuator 16 comprises:

a rotary electrical machine such as an electric motor, preferably a three-phase electric motor 24; and a gearbox 26 for reducing angular speed that is mechanically coupled between a shaft driven in rotation by the motor 24 and an outlet shaft 28 from the actuator 16.

By way of example, the gearbox 26 is suitable for reducing the angular speed of the shaft 28 relative to that of the shaft of the motor 24 by a reduction coefficient γ.

The shaft 28 serves to move the actuator 17 in rotation.

The motor 24 is powered from a controllable power supply 30. By way of example, this power supply 30 is located in the control cabinet 8. For example, the power supply 30 is a controllable inverter connected to a direct current (DC) electricity distribution network.

The actuator 16 is also fitted with a sensor 34 for sensing the magnitude $i_1$ of the current supplied to the motor 24, and a sensor 36 for sensing the angular position of the shaft 28.

The sensors 34 and 36 are connected to a control unit 38, e.g. situated inside the cabinet 8.

The control unit 38 includes a path generator 40 suitable for responding to operating parameters and coordinates of points of passage on the path 12 to determine the position, the speed, and the acceleration of the tool 10 along each of the portions of the path 12. For example, the generator 40 is suitable for determining the speed profile of the movements of the tool 10 along each of the portions AB, BC, and CD of the path 12. The speed profile defines how the speed of the effector 10 varies along the path portion as a function of time.

By way of example, for the robot 4, the vector $\vec{P}$ of operating parameters is defined by the following relationship:

$$\vec{P}=[p_1, p_2, p_3, \ldots, p_i, \ldots, p_9]^T$$

where:
- $p_1$, $p_4$, and $p_6$ are the maximum accelerations accepted on the portions of the path 12 lying respectively between the points A & B, B & C, and C & D;
- $p_2$, $p_5$, and $p_8$ are the maximum speeds accepted on the portions of the path respectively lying between the points A & B, B & C, and C & D; and
- $p_3$, $p_6$, and $p_9$ are the maximum decelerations accepted on the portions of paths respectively lying between the points A & B, B & C, and C & D.

The unit 38 is suitable for controlling the power supply 30 of each of the actuators in such a manner that the effector 10 moves along the path 12 with the speeds defined by the generator 40.

The unit 38 is associated with information storage means such as a memory 42. The memory 42 contains in particular the coordinates of the points of passage of the path 12. In this example, the memory 42 contains the coordinates in three dimensions of the points A, B, C, and D.

The unit 38 is also connected to the device 2 in order to receive the operating parameters and to send thereto the values measured by the sensors 34 and 36 of each of the actuators.

The device 2 is fitted with:
- a unit 50 for generating the operating parameters of the robot 4;
- information storage means such as a memory 52 containing the data used by the unit 50; and
- a man/machine interface 54 enabling the unit 50 to acquire data input by the user of the device 2.

By way of example, the interface 54 comprises a display screen 56 and a keyboard 58 connected to the unit 50.

The unit 50 comprises:
- a module 60 for acquiring coefficients input by the user via the interface 54;
- a module 62 for determining the cycle time, the steady operating temperature of each of the actuators, and the degree of wear of each of the actuators; and
- a module 64 for modifying the operating parameters so as to approach an extremum of a compromise function.

Figure 2:
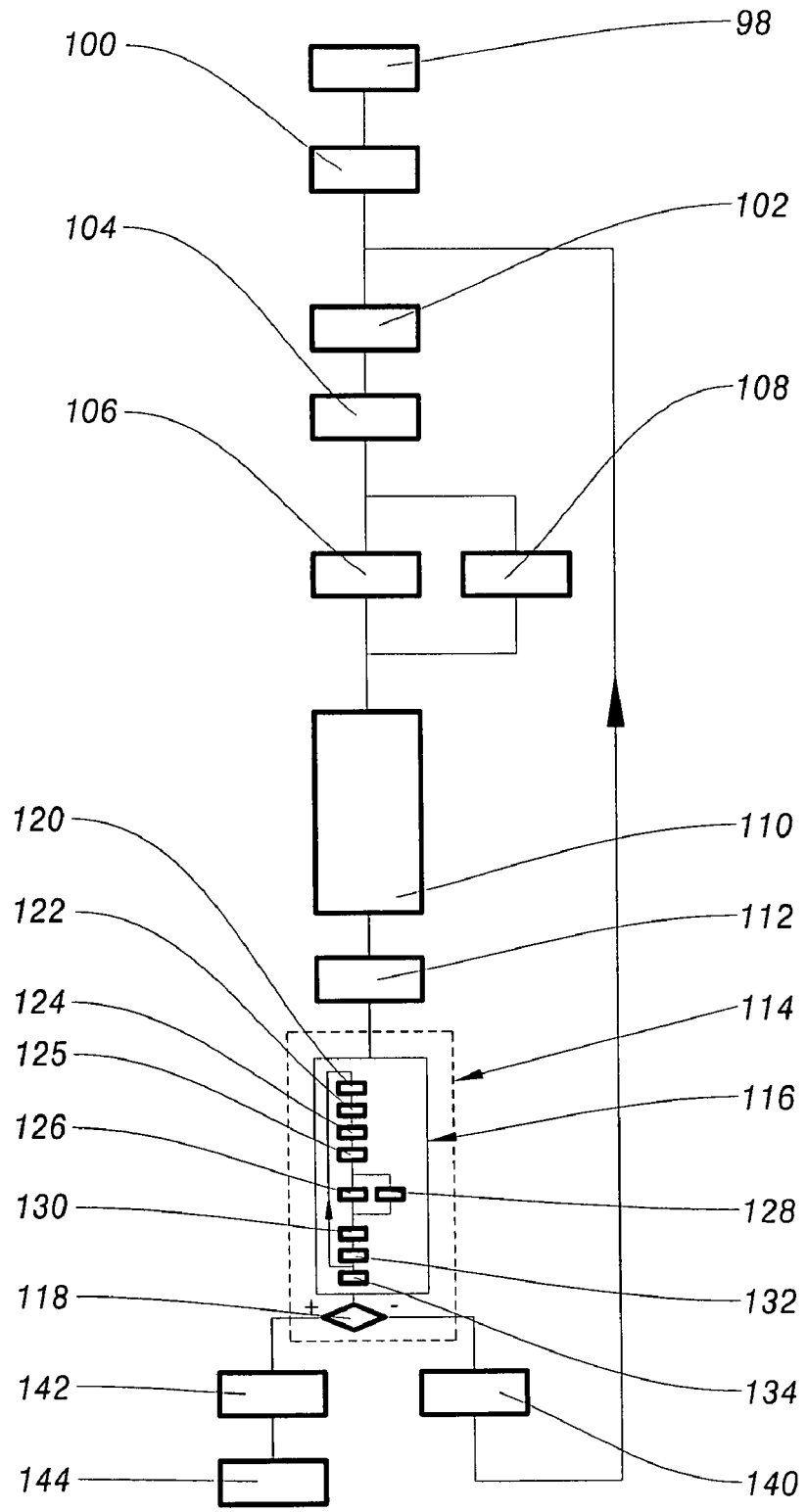
FIG. 2 is a flow chart of a method of adjusting the operating parameters of a robot using the device of FIG. 1.

The various functions of the unit 50 and of the modules 60, 62, and 64 appear on reading the description made with reference to FIG. 2.

The unit 50 in this example is based on a programmable electronic computer 70 suitable for executing a program recorded on an information recording medium. For this purpose, the memory 52 includes program instructions for executing the method of FIG. 2 when those instructions are executed by the computer 70.

The memory 52 contains a heating model 72 for each of the actuators, a wear model 74 for each of the actuators, a definition 75 of the operating limits of each of the actuators, a definition 76 of a positioning error E(t) of the tool 10, a compromise function 78, and default values 80 for all of the coefficients and the parameters used in the method of FIG. 2.

The model 72 serves to predict the operating temperature under steady conditions for each of the actuators 16 to 21 as a function of measurements performed while the tool 10 follows the path 12 on a single occasion.

By way of example, the heating model used is defined by the following relationship:

$$\vec{T} = \begin{bmatrix} T_1 \\ \vdots \\ T_6 \end{bmatrix} = A \begin{bmatrix} \frac{1}{t_c}\int_0^{t_c} \Gamma_1^2(t)\,dt \\ \vdots \\ \frac{1}{t_c}\int_0^{t_c} \Gamma_6^2(t)\,dt \end{bmatrix} + B \begin{bmatrix} \frac{1}{t_c}\int_0^{t_c} \dot{q}_1^2(t)\,dt \\ \vdots \\ \frac{1}{t_c}\int_0^{t_c} \dot{q}_6^2(t)\,dt \end{bmatrix} + \begin{bmatrix} \gamma_1 \\ \vdots \\ \gamma_6 \end{bmatrix} + T_{ext} \quad (1)$$

where:
- the indices 1 to 6 correspond respectively to the actuators 16 to 21.
- $T_i$ is the temperature of the actuator i;
- $\Gamma_i$ is the torque of actuator i;
- $\dot{q}_i$ is the angular velocity of the outlet shaft of actuator i;
- A, B are matrices of dimension 6×6 characteristic of heat exchanges in the robot 4;
- $\gamma_i$ is a constant representing a constant source of heat associated with actuator i;
- $T_{ext}$ is the ambient temperature of the surroundings of the robot;
- $t_c$ is the cycle time for traveling along the entire path 12; and
- the symbol $$\text{``}\int_0^{t_c}\text{''}$$

designates the operation of integrating relative to time t over the range 0 to $t_c$.

In this example, the instantaneous value $\Gamma_i$ of the torque is obtained from the current measurement $i_i$ performed by the current sensor associated with actuator i.

The instantaneous value of angular velocity $\dot{q}_{di}(t)$ is calculated from the positions measured by the position sensor of actuator i.

The coefficients of the matrices A and B, and the values of the constants $\gamma_i$ are determined experimentally. In this example, the coefficients of the matrices A and B take account of thermal coupling between actuators.

The outside temperature $T_{ext}$ is either set by the user or else measured.

The model 74 serves to calculate the degree of wear for each actuator as a function of the angular velocities $\dot{q}_i$ and of the torques $\Gamma_i$.

The degree of wear is representative of the lifetime of the robot. The greater the degree of wear the shorter the lifetime of the robot. In a robot, by way of example, one element that is characteristic of wear is the wear of the ball bearings in the gearbox 26. The degree of wear of an actuator can thus be calculated from the degree of wear of the ball bearings in the gearboxes of the robot, for example. Such a calculation of the degree of wear can be based on the international standard ISO 281:1990, for example.

The wear model used in this example is given by the following relationship:

$$\vec{D} = \begin{bmatrix} D_1 \\ \vdots \\ D_6 \end{bmatrix} = \begin{pmatrix} \left(\frac{1}{t_c}\int_0^{t_c}|\Gamma_1(t)|\,dt\right)^3 & \left(\frac{1}{t_c}\int_0^{t_c}|\dot{q}_1(t)|\,dt\right) \\ \vdots & \vdots \\ \left(\frac{1}{t_c}\int_0^{t_c}|\Gamma_6(t)|\,dt\right)^3 & \left(\frac{1}{t_c}\int_0^{t_c}|\dot{q}_6(t)|\,dt\right) \end{pmatrix} \quad (2)$$

where $D_i$ is the degree of wear of actuator i.

The definitions 75 define the range of torque possible for each actuator i. For example, equations (3) and (4) define the high and low torque limits as a function of the operating speeds of the actuators, giving for each actuator i:

$$L_{1,i} = \max_{path}(\Gamma_i - a_{1,i}\dot{q}_i - b_{1,i}) \leq 0 \quad (3)$$

$$L_{2,i} = \max_{path}(a_{2,i}\dot{q}_i + b_{2,i} - \Gamma_i) \leq 0 \quad (4)$$

where:

$a_{1,i}$, $a_{2,i}$, $b_{1,i}$, and $b_{2,i}$ are constants characteristic of the actuator that are determined experimentally or given by the manufacturer of the actuator; and "$\text{Max}_{path}$" is the function that returns the maximum instantaneous value of the expression in parentheses that is observed when the tool 10 has traveled along the entire path 12.

Relationships (3) and (4) indicate that the torque $\Gamma_i$ of the actuator i must lie between two straight lines each a function of angular velocity $\dot{q}_i$.

The definition 76 of the positioning error is given in this example by the following relationship:

$$Z = \max_{path}(|E(t)| - \delta) \leq 0 \quad (5)$$

where:

E(t) is the instantaneous difference between the position of the tool 10 controlled by the unit 38 and the corresponding position of the tool 10, as measured;

|| is the absolute value function; and

δ is a predetermined threshold that the difference E(t) must not cross. δ thus determines the accuracy with which the tool 10 moves along the path 12.

The compromise function 78 in this example is defined by the following relationship:

$$f(t_C, \Gamma, \dot{q}) = t_c + \sum_{i=1}^{6}\left(\alpha_{1,i}e^{\frac{D_i - D_{i,Nom}}{D_{i,Nom}}} + \alpha_{2,i}e^{\frac{T_i - T_{i,Nom}}{T_{i,Nom}}} + \alpha_{3,i}e^{L_{1,i}} + \alpha_{4,i}e^{L_{2,i}}\right) + \alpha_{5,i}e^{z} \quad (6)$$

where:

f is the compromise function;

$\bar{\alpha}_{i,j}$ are coefficients that are adjustable by the user and that have respective default values recorded in the memory 52;

$D_{i,Nom}$ is the limit value for the degree of wear of actuator i;

$\bar{T}_{i,Nom}$ is the limit value for the operating temperature of actuator i; and "e" is the exponential function.

The values $D_{i,Nom}$ and $T_{i,Nom}$ are predetermined constants. For example, the value $D_{i,Nom}$ is a constant calculated from the mechanical characteristics of the ball bearings of the gearboxes and the number of operating hours desired for the gearboxes.

By way of example, the value $T_{i,Nom}$ is given by the manufacturer of actuator i.

It should be observed that the compromise function is a sum of terms. The term "$t_c$" is a monotonically increasing function that depends solely on cycle time. Thereafter, the compromise function f for each actuator i comprises, reading from left to right:

a first term that is a monotonically increasing function depending solely on the degree of wear $D_i$;

a second term that is a monotonically increasing function depending solely on temperature $T_i$;

a third term and a fourth term that are respective monotonically increasing functions depending solely on the high and low torque limits $L_{1,i}$ and $L_{2,i}$; and a fifth term that is a monotonically increasing function depending solely on the positioning error $\epsilon_i$.

Preferably, when the cycle time varies, the sum of these last five terms varies in the opposite direction to the term "$t_c$". For example, the value of the sum of these five terms increases when the cycle time decreases. In practice, this compromise function has a minimum.

In this example, with the exception of the term "$t_c$", the other terms are all functions of a difference between a value that is measured or calculated and a limit value. These limit values do not all have the same relative importance. For example, it is much more important to avoid crossing the limit values on instantaneous torque $\Gamma_i$ than the values set for degree of wear or temperature. Crossing a limit value imposed on torque $\Gamma_i$ can lead to the actuator malfunctioning immediately, and can thus make it impossible for the robot 4 to complete traveling along the path 12. Conversely, crossing the value $D_{i,Nom}$ or the value $T_{i,Nom}$ does not prevent the robot 4 from traveling along the entire path 12, and this applies several times in succession. The only consequence of exceeding the value $D_{i,Nom}$ or $T_{i,Nom}$ is a shortening in the lifetime of the robot 4, for example, and that might be acceptable for the user if such a shortening of lifetime is compensated by a large saving in cycle time.

Similarly, in this example, it is assumed that it is absolutely essential to avoid the error E(t) exceeding the threshold δ.

Under such conditions, the values of the coefficients $\alpha_{j,i}$ must be selected so as to comply with the following relationships:

$\alpha_{1,i} = \alpha_{2,i}$ strictly less than $\alpha_{3,i}$, $\alpha_{4,i}$, and $\alpha_{5,i}$; and $\alpha_{3,i} = \alpha_{4,i} = \alpha_{5,i}$.

The operation of the device 2 is described below with reference to FIG. 2 for the special circumstance in which it is desired to minimize cycle time $t_c$.

Initially, during a step 98, the module 60 acquires values for the coefficients $\alpha_{i,j}$ that are input by the user via the man/machine interface 54. If the user desires not to proceed with a step 98, then the default values 80 are used.

Thereafter, during a step 100, the vector $\vec{P}$ of operating parameters is initialized. By way of example, the coordinates $p_i$ for the vector $\vec{P}$ are initialized from limit values for maximum acceleration, maximum speed, and maximum deceleration that are given by the manufacturer of each actuator.

Thereafter, in a step 102, the unit 50 sends the operating parameter $p_i$ to the control unit 38.

In response, during a step 104, the generator 40 calculates the path that complies with the operating parameters received for each of the portions of the path 12. To this end, the generator 40 uses the coordinates of the points of passage recorded in the memory 42 and the values received for the parameters $p_i$ to establish the speed profile of the tool 10 along each portion of the path 12.

Once the speed profiles have been established, during a step 106, the unit 38 controls each actuator 16 to 21 so that the tool 10 moves along the path 12 in compliance with the established speed profiles. Thus, during step 106, the robot 4 moves the tool 10 along the path 12.

In parallel with step 106, during a step 108, the power supply current $i_i$ and the angular positions $q_i$ of the outlet shafts of the actuators are measured. The measured values and the corresponding instants are recorded in the memory.

Once the tool 10 has traveled along the entire path 12 in one direction and then in the opposite direction so as to return to its starting point, the module 62 acts in a step 110 to determine the cycle time, the temperatures $T_i$, and the degrees of wear $D_i$ on the basis of the measured data recorded in the memory 42.

For example, during step 110, the module 62 determines the cycle time $t_c$ by taking the difference between the instant corresponding to the tool 10 leaving the point A and the instant corresponding to the tool 10 returning to the point A.

The cycle time thus includes the time taken by the tool 10 to travel along the path 12 from the point A to a point D and then to return from the point D back to the point A, passing via the points C and B.

The angular velocity $\dot{q}_i$ is calculated from the position measured by the sensors during step 108.

The module 62 also determines the temperature $T_i$ using the heating module 72 recorded in the memory 52. For this purpose, the value of the instantaneous torque $\Gamma_i$ is deduced from the value of the instantaneous current $i_i$ as measured during step 108.

Still during step 110, the module 62 determines the values of the degrees of wear $D_i$ from the wear model 74.

The difference E(t) is calculated by the module 62 from the angular positions measured during step 108 and the coordinates of the points of passage recorded in the memory 42.

Once the temperatures $T_i$, the degrees of wear $D_i$, the instantaneous torques $\Gamma_i$, the angular velocities $\dot{q}_i$, the difference E(t), and the cycle time $t_c$ have been calculated, the unit 50 in a step 112 calculates the value of the compromise function f.

Thereafter, during a step 114, the unit 50 verifies whether the compromise function f satisfies a predetermined stop criterion. For example, the unit 50 checks whether the compromise function is very close to an extremum, and more precisely in the particular example described herein, a minimum.

For this purpose, during an operation 116, the gradient $\nabla f$ of the compromise function is calculated and then compared in an operation 118 with a predetermined threshold $\epsilon$.

By way of example, the gradient $\nabla f$ is calculated using the following relationship:

$$\nabla f = \left[ \frac{f(p_1+h, p_2, \ldots, p_n) - f(p_1, p_2, \ldots, p_n)}{h}, \right.$$
$$\frac{f(p_1, p_2+h, \ldots, p_n) - f(p_1, p_2, \ldots, p_n)}{h}, \ldots,$$
$$\left. \frac{f(p_1, p_2, \ldots, p_n+h) - f(p_1, p_2, \ldots, p_n)}{h} \right]^T \quad (10)$$

where:

n is equal to 9;

the values $p_i$ are the operating parameters; and h is the step size selected for calculating the gradient.

In order to calculate the term $f(p_1, p_2, \ldots, p_i+h, \ldots, p_n)$, during a sub-operation 120, the value of the parameter $p_i$ is incremented by the step size h, and then during a sub-operation 122, the following vector $\vec{P}$ is sent to the control unit 38:

$$\vec{P} = [p_1, p_2, \ldots, p_i+h, \ldots, p_n]^T$$

Thereafter, sub-operations 124 to 132 are performed. These sub-operations 124 to 132 are identical respectively to steps 102 to 112 except that the operating parameter $p_i$ is replaced by the operating parameter $p_i+h$.

The sub-operations 120 to 132 are reiterated for each parameter $p_i$ so as to calculate each of the terms $f(p_1, \ldots, p_i+h, \ldots, p_n)$. The term $f(p_1, p_2, \ldots, p_n)$ was calculated during step 112.

Once each term $f(p_1, \ldots, p_i+h, \ldots, p_n)$ has been calculated, then during a sub-operation 134, the gradient $\nabla f$ is calculated.

During the operation 118, the gradient $\nabla f$ is compared with the threshold $\epsilon$. If the gradient is greater than the threshold $\epsilon$, then in a step 140, the module 64 automatically modifies the values of the parameters $p_i$ so as to approach the minimum of the compromise function. For example, during step 140, the module 64 moves down the gradient in association with a linear search. More precisely, during step 140, the module 64 calculates an optimum downward step size $\sigma$ using a linear search. For example, the linear search algorithm can be the Goldstein and Price algorithm. This linear search algorithm is described in the following bibliographic reference:

"Numerical optimization: theoretical and practical aspects", by J. Frédéric Bonnans, J. Charles Gilbert, Claude Lemaréchal, and Claudia A. Sagastizábal, published by Springer.

Each parameter $p_i$ is then modified during the step 140 using the following relationship:

$$p_{i,k+1} \leftarrow p_{i,k} - \sigma \nabla f \quad (11)$$

where:

$p_{i,k}$ and $p_{i,k+1}$ represents respectively the value of the parameter $p_i$ before and after step 140.

At the end of step 140, the method returns to step 102.

If the value of $\nabla f$ is less than the threshold $\epsilon$, then the unit 50 proceeds with a step 142 during which the steps 102 to 140 are stopped and the current values of the operating parameters are recorded.

During a step 144, the operating parameters recorded in step 142 are used by the unit 38 for controlling the movements of the arm 6.

Figure 3A:
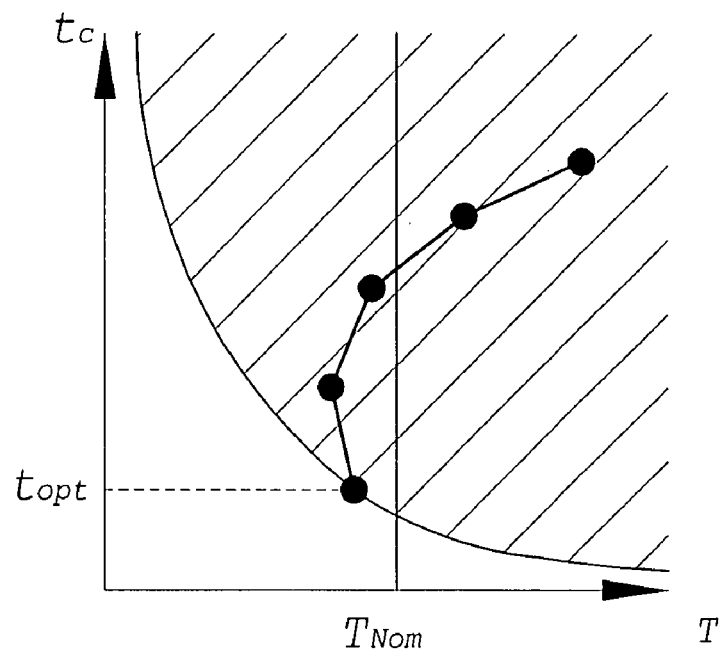
FIGS. 3A and 3B are graphs showing respectively the situations 1) and 2) described in the above introduction.
Figure 3B:
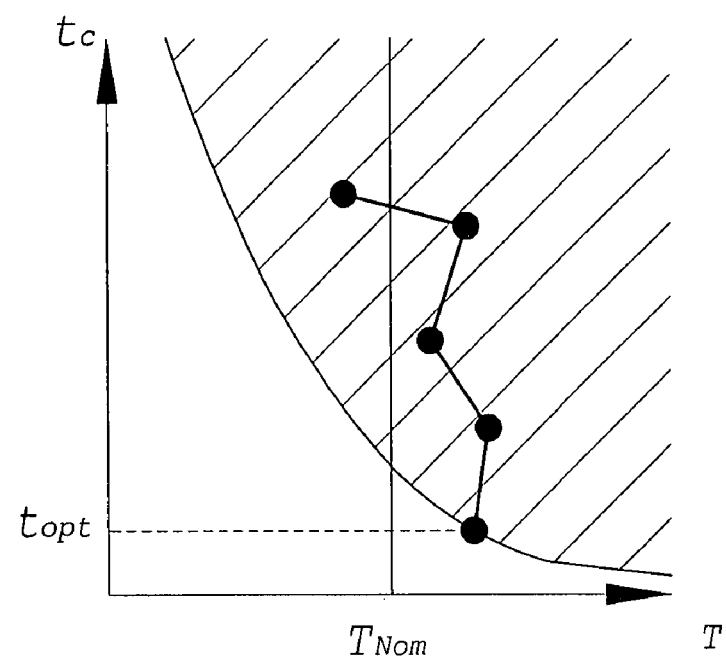

FIGS. 3A and 3B show various, points illustrating the path trace followed by the method of FIG. 2 in order to reach the optimum cycle time. The shaded zones in FIGS. 3A and 3B represent the sets of cycle times and temperatures that can be reached by the system with varying operating parameters $p_i$. On these graphs, the limit value for temperature T is written $T_{Nom}$ and the optimum value of the cycle time obtained with the method of FIG. 2 is written $t_{opt}$.

FIG. 3A shows a situation in which increasing the operating temperature of the actuator does not lead to a significant improvement in the cycle time $t_c$, such that the optimum cycle time obtained at the end of the method of FIG. 2 is obtained for a temperature that is strictly less than the limit temperature $T_{Nom}$.

Conversely, FIG. 3B shows the same physical magnitudes but for circumstances in which slightly exceeding the limit value $T_{Nom}$ leads to a significant improvement in the cycle time. Under such conditions, the optimum value $t_{opt}$ for the cycle time is obtained for an operating temperature that is strictly greater than the limit value $T_{Nom}$.

Numerous other embodiments of the device 2 are possible. In particular, there are numerous possible variants of the compromise function. The compromise function is described above for the particular circumstance in which it is formed by a sum of terms. In a variant, the compromise function could be formed by any increasing function of terms having a harmful effect on the cycle time. For example, the function $$(\sum_{i=1}^{6})$$

could be replaced by a function that returns the maximum of the terms.

The term $t_c$ in relationship (6) could be replaced by the following term:

$$\beta e^{\frac{(t_c - t_{c,nom})}{t_{c,nom}}}$$

where:
 β is a weighting coefficient selected by the user; and
 $t_{c,nom}$ is the optimum cycle time that it is desired to reach.

In a variant, either the term that is a function of the degree of wear $D_i$ or the term that is a function of the temperature $T_i$ is omitted if the degree of wear or the operating temperature of the actuator is not to be taken into account when obtaining an optimum cycle time.

If positioning error is of no importance, then the term that is a function of the difference E(t) can be omitted.

Other additional terms could be added to the compromise function providing the function increases a function of said terms, and said terms have values that increase with increasing undesirable effect. For example it is possible to add a term that represents the positioning error of the tool 10 relative to a point of passage on the path 12, or a maximum power consumed by one or more actuators.

The iterations of steps 102 to 140 can also be stopped manually by the user once the user is satisfied by the results that have been achieved.

Other criteria for stopping the iteration of steps 102 to 140 can be used. For example, iterating the steps can be stopped when the difference between the compromise function during the preceding iteration and the value of the compromise function during the current iteration is less than a predetermined threshold. Iterations can also be stopped if the number of iterations exceeds a predefined threshold.

In a simplified implementation, the heating model does not take account of thermal coupling between the various actuators of the robot 4. The method of calculating temperatures $T_i$ as described in WO 02/074501 can then be applied.

The operating range of each actuator can be defined on the basis of magnitudes other than the instantaneous torque $\Gamma_i$. For example, it could be defined by a maximum current consumed by the actuator, a maximum angular velocity, or any other parameter given by the manufacturer of the actuator.

In a variant, the device 2 is not associated with the robot 4 but with an emulator of the robot 4. The emulator must be suitable for generating the path followed by the tool 10 and the values needed for implementing the device 2. For example, the emulator generates the instantaneous values of the angular positions of the outlet shafts of the actuator and also the value of the current consumed by each actuator.

The temperatures $T_i$ could be measured instead of being estimated on the basis of relationships (1) and (2).

The invention claimed is:

1. A method of adjusting operating parameters for at least one actuator of a robot for moving an effector tool along a given path with an optimum cycle time, the operating parameters determining at least a travel speed of the tool along the given path, the method making use of measurements taken during one of a real movement of the effector tool and on the basis of measurements delivered by a robot movement emulator, and comprising:
  a) supplying operating parameters to an actuator controller to control operation of the at least one actuator to move the effector tool along the given path and determining a value of a cycle time for the effector tool to travel the given path as a function of the values of the operating parameters;
  b) sensing at least one of the value of an operating temperature and a value of a degree of wear of the at least one actuator for moving the effector tool of the robot resulting from the effector tool moving along the given path and supplying the at least one value to a computer device; and
  c) using the computer device to modify the values of the operating parameters to move the cycle time closer to its optimum value;
  wherein, during step c), the values of the operating parameters are automatically modified so as to approach an extremum of a compromise function, the compromise function comprising at least first and second terms, the first term being a function of the cycle time determined during step a), and the second term being a function of the at least one of temperature and the degree of wear determined during step b) and wherein the first term varies in a direction opposite to a direction of the second term.

2. A method according to claim 1, including sensing instantaneous torque exerted by the at least one actuator and wherein the compromise function also includes a third term that is a function of the sensed instantaneous torque exerted by the at least one actuator.

3. A method according to claim 1, including sensing a positioning error of the effector tool during movement along the given path and wherein the compromise function also includes a fourth term that is a function of the positioning error of the effector tool relative to the given path.

4. A method according to claim 1, wherein at least one of the first and second terms includes an adjustable coefficient, and in that the method includes a step of a user adjusting the value of said coefficient by input into the computer device.

5. A method according to claim 1, wherein at least one of the first and second terms is a function of the difference between the values determined during step a) or b) and a limit value given for said values.

6. A method according to claim 1, wherein during step b) a thermal coupling between a plurality of actuators is sensed taken into account in order to determine the operating temperature of the at least one of the actuators.

7. A method according to claim 1, wherein during step b) the computer device makes a prediction of the at least one of the value of the temperature and value of the degree of wear under steady conditions is established on the basis of data sensed during a single journey of the effort tool along the given path, and in that the prediction of the at least one of the value of the temperature and the value of the degree of wear is used by the computer device to modify the values of the operating parameters during step c).

8. A method according to claim 1, including a step of the computer device automatically verifying that the compromise function satisfies a predetermined stop criterion, and in the event of the compromise function satisfying the stop criterion, a step of automatically stopping iteration of steps a) to c).

9. A method according to claim 8, wherein the step of verifying consists of the computer device determining whether a norm of a gradient of the compromise function relative to the operating parameters is less than a predetermined threshold.

10. A computer readable medium encoded with instructions for implementing a method in accordance with claim 1 when said instructions are executed by the computer device.

11. A device for adjusting operating parameters of actuators of a robot for moving an effector tool along a given path in an optimum cycle time, the operating parameters determining at least the travel speed of the effector along the given path, the device responding to measurements performed during at least one of real time movement of the effector tool and readings delivered by a robot movement emulator, and comprising:
  a) a determination module for determining a value of the cycle time as a function of the values of the operating parameters supplied to a controller for controlling operation of the at least one actuator, and for determining at least one of a value of the operating temperature and a value of a degree of wear of the at least one actuator of the robot as a result of traveling along the complete path; and
  b) a modification module for automatically modifying the values of the operating parameters in order to cause the cycle time to approach an optimum value;
  wherein the modification module is suitable for modifying the values of the operating parameters so as to approach an extremum of a compromise function, the compromise function including at least first and second terms, the first term being a function of the cycle time and the second term being a function of the at least one of the temperature and the degree of wear determined by the module a).

12. A device according to claim 11, wherein at least one of the first and second terms includes an adjustable coefficient, and in that the device includes a man/machine interface enabling a user to adjust the value of the coefficient.

* * * * *